United States Patent [19]
Schmid

[11] 3,930,378
[45] Jan. 6, 1976

[54] AXIALLY-DISPLACEABLE AND ANGULARLY-MOVABLE UNIVERSAL COUPLING

[76] Inventor: Leopold F. Schmid, Leharstrasse 8, 7000 Stuttgart 1, Germany

[22] Filed: Sept. 5, 1974

[21] Appl. No.: 503,360

[30] Foreign Application Priority Data
Nov. 8, 1973 Germany............................ 2355766

[52] U.S. Cl............................ 64/8; 64/17 R; 64/21; 64/7
[51] Int. Cl.² ............................................ F16D 3/02
[58] Field of Search ....... 64/8, 7, 6, 21, 17 R, 17 A, 64/23

[56] References Cited
UNITED STATES PATENTS

| | | | |
|---|---|---|---|
| 1,582,997 | 5/1926 | McGee | 64/8 |
| 2,926,510 | 3/1960 | Lorean | 64/8 |
| 3,029,617 | 4/1962 | Marquis et al. | 64/8 |
| 3,310,959 | 3/1967 | Sheppard | 64/17 R |
| 3,613,396 | 10/1971 | Drevard et al. | 64/21 |
| 3,757,534 | 9/1973 | Orain | 64/8 |
| 3,802,221 | 4/1974 | Kimata | 64/8 |

FOREIGN PATENTS OR APPLICATIONS

| | | | |
|---|---|---|---|
| 1,185,868 | 1/1965 | Germany | 64/8 |

*Primary Examiner*—Samuel Scott
*Assistant Examiner*—Randall Heald
*Attorney, Agent, or Firm*—Haseltine, Lake & Waters

[57] ABSTRACT

A universal coupling which is axially displaceable and angular movable, in which the torque is transmitted by three rolling parts evenly distributed about the circumference. The three rolling parts are connected to the inner part of the coupling in a rotatable and radially-movable manner. The three rolling parts also project into grooves. The displacement of the rolling parts required during an angular movement is carried out with the aid of a spring-derived force. The rolling parts, furthermore, have a cylindrical pin located in a radial bore of the inner part of the coupling, and the rolling parts are pushed radially outward by a force pushing on the inner end of the cylindrical pin.

11 Claims, 7 Drawing Figures

AXIALLY-DISPLACEABLE AND ANGULARLY-MOVABLE UNIVERSAL COUPLING

BACKGROUND OF THE INVENTION

The present invention relates to an axially-displaceable and angularly-movable, evenly-running universal coupling, in which the torque is transmitted by three rolling parts which are distributed equiangularly. The rolling parts are connected to the inner part of the coupling in a rotatable and radially movable manner. The rolling parts, furthermore, project into grooves in the outer part of the coupling, which are straight and parallel to the axis. To achieve even running, the displacement of the rolling parts required during an angular movement is accomplished with the aid of a force, pushing the rolling part outward. This force is a spring derived or spring-actuated force.

Universal couplings of the preceding species and known in the art, have the inner part of the coupling constructed of three-legged form. In this arrangement, so-called thrust stones are supported on the corresponding studs, in a slidable and rotatable manner for torque transmission. In contrast to the prior art, in which the thrust stones are coated with relatively thin discs of elastic material, an arrangement disclosed in the German Patent No. 2,216,345 operates in the following manner: For exerting an outward-directed force on the thrust stones, a ring is provided on one or both sides of the three-legged structure. This ring is in contact with each of the thrust stones when force is exerted parallel to the axis of each.

The difficulty of arriving at an effective solution with the aid of elastic discs, in the prior art, has been extensively described in a review of the state of the art in the German Patent No. 2,216,345. The arrangement disclosed by this German patent, has the disadvantage of requiring costlier construction and manufacture, and it is also associated with the danger that breakage of the highly-stressed rings could cause the pieces to destroy the universal coupling.

The two arrangements above of the prior art, also have the common disadvantage that the relatively large controlling force applied by the spring elements, does not act near the center of the axis of rotation of the thrust stones. Instead, the force acts substantially far out therefrom. A large braking torque results, thereby, and the thrust stones, prevented from rotating, cause wear, heating, and ineffectiveness.

Accordingly, it is an object of the present invention to provide a universal coupling of the character described above, and which avoids the disadvantages mentioned supra.

Another object of the present invention is to provide a universal coupling of the foregoing character, which is simple in design and may be economically fabricated.

A still further object of the present invention is to provide a universal coupling, as described, which has a substantially long operating life and may be readily maintained.

SUMMARY OF THE INVENTION

The objects of the present invention are achieved by providing that the rolling parts have a cylindrical pin located in a radial bore of the inner part of the coupling, in a rotatable and radially-movable manner. The rolling parts are pushed radially outward by a force pushing on the inner end of the cylindrical pin, and derived from a spring element. The spring element is located in a central bore of the inner part of the coupling, and running axially.

The spring element can be constructed so that it produces its spring force in an axial direction, and that this force is then converted into a radial force by an intermediate element. The latter is between the spring element and the inner end of the cylindrical pin. In such a case, the intermediate element can be provided with a conical surface, while the inner end of the cylindrical pin is rounded. It is also possible, on the other hand, to construct the intermediate element as a sphere, and to provide the inner end of the cylindrical pin with a conical surface.

The spring element can also be constructed so that it directly provides three forces pushing radially outward, and being uniformly distributed angularly about the circumference. In such an arrangement, the spring element can be constructed of an elastically deformable material of high stiffness, as for example, a hard polyurethane rubber. Such a spring element can consist of a basic structure, touching the bore of the inner part of the coupling in three places, out of which protrude three pressure elements for acting on the inner ends of the cylindrical pins of the three rolling parts.

The outer end of the cylindrical pin of the roller parts is provided with a spherical surface, the center of the sphere lying at the point which is the center of the sphere that constitutes the outer diameter of the rolling part. This spherical surface at the outer end of the cylindrical pin serves for supporting the roller parts against the grooves of the outer part of the coupling.

The main advantage achieved by the present invention resides particularly in the location of the spring element in a central bore of the inner element of the coupling. This permits an advantageous construction of the spring element. The construction is simple, can be easily manufactured, and has a large operating volume, as well as correspondingly low stress. Should a spring element break, despite the low stresses, due to failure of the material, for example, then no damage can occur. This results from the condition that even the smallest pieces resulting from breakage are stopped by the intermediate element. The construction of the evenly-running universal coupling, according to the present invention, is substantially simple in design, and the few robust individual parts are relatively inexpensive and easy to manufacture. The outer diameters of the rolling parts are large, and the diameters of their cylindrical pins are small. Accordingly, when taken together with forces applied near the center, these conditions result in the best possible arrangement for effectiveness, even with large amounts of displacement and large bending angles.

The novel features which are considered as characteristic for the invention are set forth in particular in the appended claims. The invention itself, however, both as to its construction and its method of operation, together with additional objects and advantages thereof, will be best understood from the following description of specific embodiments, when read in connection with the accompanying drawings.

DESCRIPTION OF THE PREFERRED EMBODIMENTS

Figure 2:
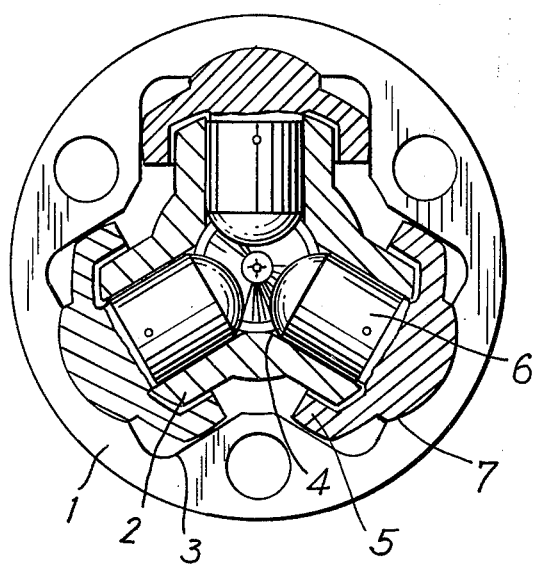
FIG. 2 is a partial cross-sectional side view of the embodiment of FIG. 1.
Figure 1:
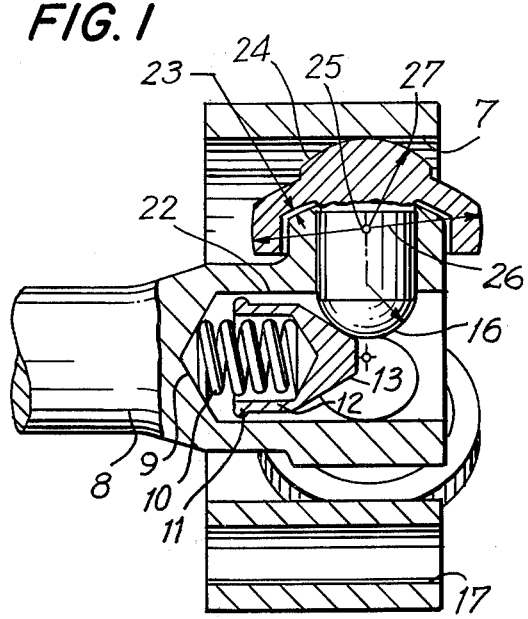
FIG. 1 is a partial sectional view taken through the longitudinal axis, and shows one embodiment of a universal coupling, in accordance with the present invention.
Figure 4:
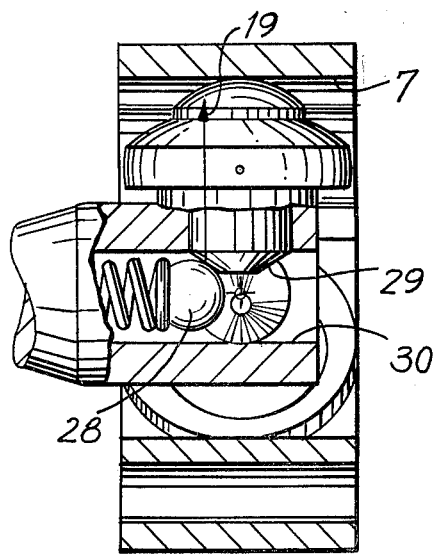
FIG. 4 is a partial sectional view of another embodiment of a universal coupling, in accordance with the present invention.
Figure 3:
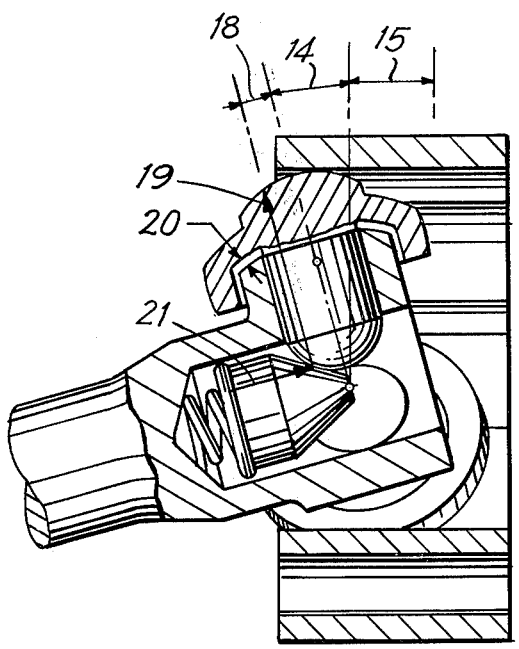
FIG. 3 is a partial sectional view of a coupling as shown in FIG. 1, but with the inner part of the coupling subjected to an axial displacement and an angular movement.
Figure 5:
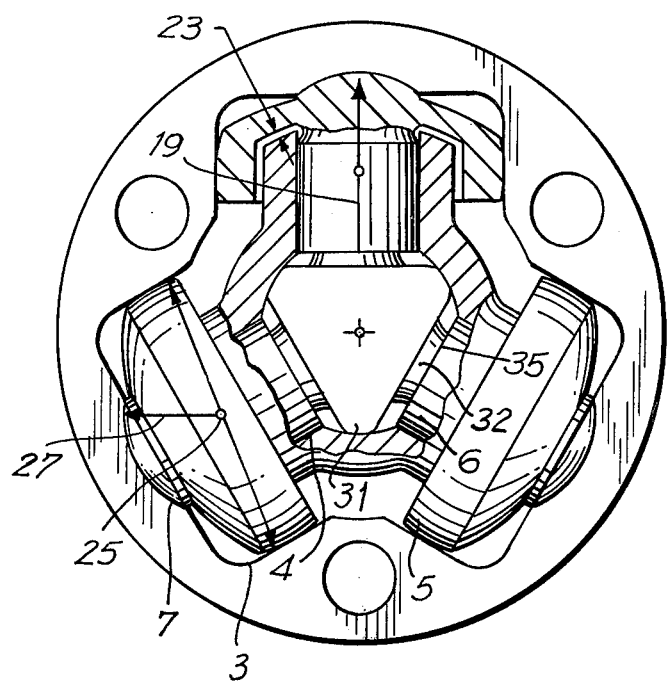
FIG. 5 is a partial cross-sectional view of a third embodiment of a universal coupling, in accordance with the present invention.
Figure 6:
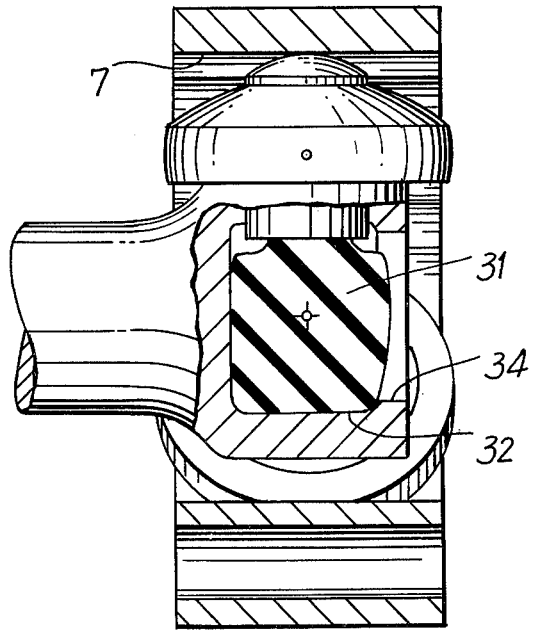
FIG. 6 is a partial sectional view taken through the longitudinal axis of the embodiment of FIG. 5.
Figure 7:
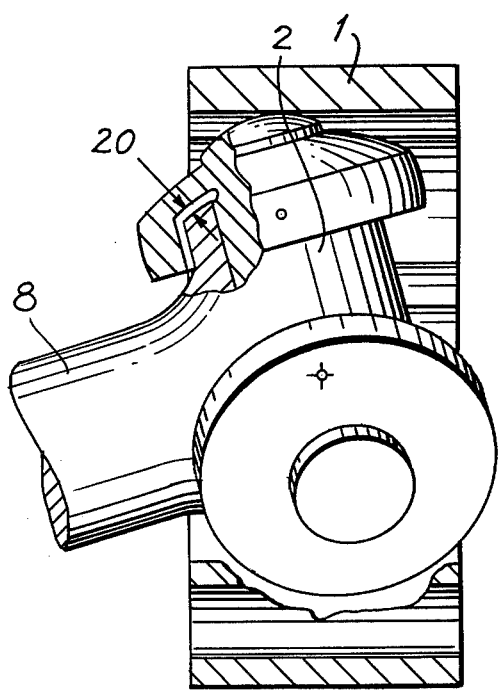
FIG. 7 is a partial sectional view of the arrangement of FIG. 6, with the inner part of the coupling subjected to an angular displacement.

Referring to the drawing, the outer part of the coupling 1 is provided with grooves 3 evenly distributed about the circumference. To transfer the torque, rolling parts 5 engage these grooves. Rolling part 5 has a cylindrical pin 6, located within bore 4 of the inner part of the coupling 2, in a rotatable and radially displaceable manner.

The outer end 24 of the cylindrical pin 6 of the rolling part 5, is provided with a spherical surface 27. The spherical center 25 of this spherical surface 27, is located at the center of the sphere 26. The latter constitutes the outer diameter of rolling part 5. Spherical surface 27 serves for supporting the rolling part 5 against the grooves 7 of the outer coupling part 1. For even motion, and angular displacement 14 requires a radial displacement of the roller parts by the difference between dimensions 20 and 23.

This is accomplished by a force 19 arising from spring element 10, 31, which pushes the rolling parts radially outward. The spring element is located in the central bore 22, 30, 33, of the inner coupling 2. The spring element 10, furthermore, is supported on the bottom 9 of the central bore, and it exerts its force in an axial direction. The axial force 21 is converted by intermediate element 12, 28, into a radial force 19.

The intermediate element 12, 28, is located between spring element 10 and the inner end 16, 29 of the cylindrical pin 6. With use of the intermediate element 12, provided with conical surface 13 and centered by collar 11, the inner end of cylindrical pin 6 is rounded.

When using an intermediate element 28 in the form of a sphere, the inner end of cylindrical pin 6 is provided with conical surface 29. Spring element 31 is constructed for providing three radially outward-pushing forces 19, which are evenly distributed about the circumference. This spring element is constructed, furthermore, of an elastically deformable material of substantially high stiffness as, for example, hard polyurethane rubber.

To act on the inner end 35 of the cylindrical pin 6, the spring element is provided with three pressure elements 32, and is constructed so as to touch the bore 33 at three places. As a result, substantially the entire volume of spring element 31 is active and functions.

The shaft which is rigidly connected to the inner part of the coupling is designated by the reference numeral 8, and the length of the displacement is indicated by the reference numeral 15. The shoulder 34 holds the spring element 31 to the inner part of the coupling. The bore 17 serves for connecting the outer part of the coupling to its respective shaft. The distance 18 of the force 19 from the center of rotation of the rolling part 5, is substantially small, and the difference between the outer diameter of rolling part 5 and that of the cylindrical pin 6 is substantially large. Accordingly, universal couplings constructed in accordance with the present invetion, rotate particularly smoothly. In addition to being very effective, the couplings of the present invention have a substantially long operating life.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalance of the following claims.

I claim:

1. An axially displaceable and angularly movable, evenly-running universal coupling comprising, in combination, an inner coupling member with a radial bore; three rolling elements equi-angularly distributed and connected rotatably and radially movable to said inner coupling member for transmitting torque; an outer coupling member having straight-lined grooves parallel to the axis of said outer coupling member, said rolling elements protruding into said grooves; spring means for applying a radial force pushing said rolling elements outward to displace said rolling elements during an angular movement for even-running of said universal coupling, said rolling elements having a cylindrical pin rotatable and radially movable in said radial bore, said spring means applying a force on the inner end of said cylindrical pin for pushing said rolling elements radially outward.

2. The universal coupling as defined in claim 1 including a central and axially directed bore in said inner coupling member for holding said spring means.

3. The universal coupling as defined in claim 2 including an intermediate member between the inner end of said cylindrical pin and said spring means said spring means applying a radially directed force to said cylindrical pin through said intermediate member.

4. The universal coupling as defined in claim 3 wherein said intermediate member has a conical-shape surface, said inner end of said cylindrical pin being rounded.

5. The universal coupling as defined in claim 3 wherein said intermediate member is spherical-shaped, said inner end of said cylindrical pin having a conical-shaped surface.

6. The universal coupling as defined in claim 2 wherein said spring means comprises three force applying members equiangularly distributed and directed radially outward.

7. The universal coupling as defined in claim 6 wherein said spring means comprises of elastic deformable material of substantially high strength.

8. The universal coupling as defined in claim 7 wherein said spring means comprises a main member within a bore of said inner coupling member, said main member having three pressure applying bosses for abutting the inner ends of said cylindrical pin of said three rolling elements.

9. The universal coupling as defined in claim 1 wherein said cylindrical pin of said rolling elements have a spherical surface on the outer end, the spherical center of said spherical surface being at the center of the sphere conforming to the outer surface of said rolling element.

10. The universal coupling as defined in claim 9 wherein said spherical surface on the outer end of said cylindrical pin abuts said rolling elements against said grooves of said outer coupling member.

11. The universal coupling as defined in claim 4 wherein said spring means comprises elastic deformable material of substantially high strength and having a main member within a bore of said inner coupling member, said main member having 3 pressure applying bosses for abutting the inner ends of said cylindrical pin of said 3 rolling elements, said cylindrical pin as said rolling elements having a spherical surface on the outer end, the spherical center of said spherical surface being at the center of the sphere conforming to the outer surface of said rolling element, said spherical surface on the outer end of said cylindrical pin abutting said rolling elements against said grooves of said outer coupling member.

* * * * *